(12) United States Patent
Kimura et al.

(10) Patent No.: US 9,128,287 B2
(45) Date of Patent: Sep. 8, 2015

(54) DISPLAY DEVICE

(75) Inventors: Yasukazu Kimura, Chiba (JP); Jun Fujiyoshi, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 336 days.

(21) Appl. No.: 13/483,089

(22) Filed: May 30, 2012

(65) Prior Publication Data

US 2012/0307333 A1    Dec. 6, 2012

(30) Foreign Application Priority Data

Jun. 3, 2011    (JP) ................... 2011-124802

(51) Int. Cl.
*G02B 26/08*    (2006.01)
*G02B 26/02*    (2006.01)

(52) U.S. Cl.
CPC ............ *G02B 26/02* (2013.01); *G02B 26/0841* (2013.01)

(58) Field of Classification Search
CPC ............... G02B 26/02; G02B 26/0841; G02B 26/0833; G02B 26/0816; H01L 2924/00013; H01L 2924/00014
USPC ............................ 359/223.1–224.1, 230, 872
See application file for complete search history.

(56) References Cited

U.S. PATENT DOCUMENTS

| | | | |
|---|---|---|---|
| 7,289,259 B2 | 10/2007 | Chui et al. | |
| 7,417,782 B2 | 8/2008 | Hagood et al. | |
| 7,675,665 B2 | 3/2010 | Hagood et al. | |
| 7,679,812 B2 | 3/2010 | Sasagawa et al. | |
| 7,781,850 B2 | 8/2010 | Miles et al. | |
| 2002/0097952 A1* | 7/2002 | Jin et al. ................. | 359/872 |
| 2006/0250325 A1 | 11/2006 | Hagood et al. | |
| 2007/0002156 A1 | 1/2007 | Hagood, IV et al. | |
| 2010/0062616 A1 | 3/2010 | Liu et al. | |

FOREIGN PATENT DOCUMENTS

| | | |
|---|---|---|
| CN | 102076602 A | 5/2011 |
| EP | 1508829 A2 | 2/2005 |
| JP | 2001328144 A | 11/2001 |
| JP | 2005066727 A | 3/2005 |
| JP | 2007052256 A | 3/2007 |
| JP | 2008-197668 | 8/2008 |
| JP | 2010181648 A | 8/2010 |
| WO | 2006036435 A1 | 4/2006 |
| WO | WO 2006/091738 A1 | 8/2006 |
| WO | 2007013992 A1 | 2/2007 |
| WO | 2010062616 | 6/2010 |

* cited by examiner

*Primary Examiner* — Euncha Cherry
(74) *Attorney, Agent, or Firm* — Edward A. Gordon; Foley & Lardner LLP

(57) ABSTRACT

A MEMS substrate is formed from a transparent substrate and a movable type shutter arranged on each pixel of a surface of the transparent substrate. An AP substrate includes another substrate and a light blocking film arranged on the other transparent substrate formed with an aperture corresponding to each shutter. A plurality of supporting columns is formed on a surface of the transparent substrate of the MEMS substrate. A plurality of cylindrical contact holes having the same inner diameter as an outer diameter of each supporting column are formed at a position corresponding to one part of the supporting columns. Both substrates are arranged with a certain interval so that each shutter and an aperture oppose each other, thereby a tip end of corresponding supporting columns is inserted into each contact hole and in this way, both substrate are mutually positioned.

20 Claims, 8 Drawing Sheets

(a)

(b)

Prior Art

Prior Art

DISPLAY DEVICE

CROSS REFERENCE TO RELATED APPLICATION

This application is based upon and claims the benefit of priority from the prior Japanese Patent Application No. 2011-124802, filed on 3 Jun. 2011, the entire contents of which are incorporated herein by reference.

FIELD

The present invention is related to a display device and in particular, a display device having a movable type shutter arranged on each pixel using MEMS (Micro Electro Mechanical System) technology.

BACKGROUND

Various display devices such as a plasma display device, liquid crystal display device and an organic electro luminescence display device are used as a display device.

For example, a display device arranged with a movable type shutter formed using MEMS technology is proposed as a new display device as is shown in Japanese Laid Open Patent Application 2008-197668. An example of a movable type shutter 1 formed on a transparent substrate (SUB1) is shown in FIG. 6 and FIG. 7. FIG. 6 is a perspective view and FIG. 7 is a planar view.

A shutter (SH) is a structural component of the movable type shutter 1 having a flat plate shape and formed with an aperture part (OP1) which allows light to pass through. Furthermore, the shutter (that is, plate shaped shutter) is supported by four first springs (SP1, SP1') arranged on both side of the shutter (SH). The base of the first spring (SP1, SP1') is fixed to the substrate (SUB1) by an anchor part (AN1, AN1'). The first spring (SP1, SP1') and shutter (SH) are held in a floating state from the substrate (SUB1). In addition, the base of second springs (SP2, SP2') is fixed to the substrate (SUB1) by an anchor part (AN2, AN2'). The second spring (SP2, SP2') is held in a floating state from the substrate (SUB1).

The surface of the first and second spring (SP1, SP1', SP2, SP2') is formed from a conductive material covered by an insulation film. In addition, each spring (SP1, SP1', SP2, SP2') conducts to a wire (not shown) arranged on the substrate (SUB1) via the anchor part (AN1, AN1', AN2, AN2').

A voltage is applied between anchor part AN1 and anchor part AN2 in order to drive the movable type shutter 1 in the arrow C direction shown in FIG. 7. Electric charges having respective polarities different from each other are accumulated in the first spring SP1 and the second spring SP2 thereby an electrostatic force is generated between the springs SP1, SP2, the springs SP1, SP2 are brought closer together and the first spring SP1 compresses in the arrow C direction. On the other hand, the same potential is applied to both of the first spring SP1' and second spring SP2'. In this way, the first spring SP1' extends in the arrow C direction.

Next, when the same potential exists both of the anchor part AN1 and anchor part AN2, the shutter SH moves in the arrow direction D in FIG. 7 by the rebound force of the first spring (SP1, SP1') and second spring (SP2, SP2'), and returns to its original position. At this time, when a voltage is applied to both of the anchor part AN1' and anchor part AN2', the shutter SH moves even faster in the arrow D direction.

Another transparent substrate (not shown in the diagram) is arranged opposite the transparent substrate (SUB1) formed with the movable type shutter 1. An aperture which allows light to pass through is formed on the surface of this other substrate. In addition, when the shutter SH moves in the arrow C-D direction, the relative positional relationship between the position of the opening part (OP1) formed in the shutter and this aperture changes.

For example, in the case where a back light unit is arranged on the rear surface side of the substrate formed with an aperture, the opening part (OP1) and the position of the aperture overlap and light from the back light unit passes through, and when the position of the opening part (OP1) and the aperture are shifted from each other, the light from the back light is blocked by the shutter SH. In this way, it is possible to display an image by controlling (switching) the transmittance of the light from the back light unit.

In addition, in the case of displaying a color image, light sources corresponding to the three prime colors (RGB) are used as a back light unit. In addition, while each color light source is repeatedly flashed in sequence, an image of each color is displayed in sequence by driving the shutter on each pixel in synchronization with this flashing.

Because this type of MEMS display device does not use a polarization plate or color filter, the usage efficiency of light is high and significant power saving is possible even when compared to a plasma display device or liquid crystal display device. In addition, because a MEMS display device has a faster response speed than liquid crystal, it is possible to provide high video performance. In addition, a MEMS display device can realize high luminance and long life compared to an organic electro luminescence display device.

In a MEMS display device, it is necessary to arrange a transparent substrate (called a "first substrate" or "MEMS substrate") arranged with a movable type shutter, and a transparent substrate (called a "second substrate" or "AP substrate") formed with an aperture with a certain interval with a high level of precision. As a result, in a conventional MEMS display device, a plurality of supporting columns is formed on the AP substrate and a base which receives the columns is formed on the MEMS substrate.

FIG. 8 is a diagram which explains a part of the manufacturing process of a conventional MEMS display device. As is shown in FIG. 8, photo resist patterns RE1 and RE2 are formed in the shape corresponding to the structure of a movable type shutter or shape of the base on the first substrate (SUB1). The resist pattern RE1 is used in order to form a contact hole for obtaining conductivity from a wire arranged on the first substrate (SUB1) or in order to separate the shutter SH and first and second springs (SP1, SP1', SP2, SP2') from the first substrate (SUB1). The resist pattern RE2 is used in order to form the shape in a perpendicular direction (height direction in FIG. 3) of the shutter SH and first spring (SP1, SP1') and second spring (SP2, SP2').

In FIG. 8, a conductive film such as a semiconductor is formed on the surface of the resist patterns (RE1, RE2) in order to secure conductivity and a metal film (ME1) is stacked thereupon to secure light blocking effects. Next, a resist pattern RE3 corresponding to the planar surface shape of the shutter SH or first and second springs is formed.

Etching is performed using the resist pattern RE3, so that the shutter SH and first (SP1, SP1') and second (SP2, SP2') springs etc are formed. Following this, unnecessary parts of the resist patterns (RE1~RE3) are removed and an insulation film IN is formed as in FIG. 8 (c) on the surface of the remaining metal film (ME1) and conducting film (CL).

The base PE arranged on the MEMS substrate is formed via the same manufacturing process as the shutter SH, first spring (SP1, SP1'), second spring (SP2, SP2') and anchor part AN1.

On the other hand, a metal film (ME2) which becomes a light blocking film is formed on a transparent substrate (SUB2) for the AP substrate and the metal film of the aperture part is removed using a photo resist pattern in order to form an opening corresponding to the aperture. In addition, a column (CO) is formed on the metal film (ME2) by burning the photo resist as is shown in FIG. 8 (d).

The MEMS substrate (SUB1) and AP substrate (SUB2) are arranged opposite each other so as to bring the shutter SH and aperture closely facing each other. At this time, a tip end of the AP substrate support column (CO) is received by the base (PE) of the MEMS substrate.

The MEMS substrate and AP substrate are bound together by mechanically alignment using an alignment mark (not shown in the diagram) formed on each substrate. As a result, the alignment precision of the MEMS substrate and AP substrate is limited by the precision of a device for bonding the substrates together.

In addition, the base formed on the MEMS substrate and the supporting column formed on the AP substrate are both formed in a shape having a thickness in a height direction (vertical direction in the diagram) using a resist pattern. Therefore, when an external impact is received, the impact is not absorbed by the elasticity of the base itself formed on the MEMS substrate, which causes problems such as the supporting column on the AP substrate piercing the base, the surface of the base becoming chipped or misalignment between the support column and base. It is considered that the reason for this occurs is because a contact boundary between two parts the same material exists in case a projection (support column and base) is formed on each of two opposing substrates.

The aim of the present invention is to provide a display device in which self-alignment is performed during a bonding together process of a MEMS substrate and AP substrate and having a high level of reliability towards external impacts.

SUMMARY

A display device of the present disclosure includes a first substrate arranged with a movable type shutter on a transparent substrate, and a second substrate arranged with an aperture corresponding to the movable type shutter, the aperture allowing light to pass through and the first substrate and second substrate being arranged opposite each other at a certain interval, wherein a plurality of supporting columns is formed on a surface of the second substrate which opposes the first substrate, and a contact hole for holding one of the plurality of supporting columns is formed in the first substrate, the plurality of supporting columns being inserted into the contact hole.

The movable type shutter may include a plate-shaped shutter blade formed with an opening, a spring connected at one end to the plate-shaped shutter blade, and an anchor part connecting to another end opposite to the end connected to the plate-shaped shutter blade. In addition, a first layer thin film and a second layer thin film stacked touching the first layer film may be formed on the transparent substrate, and the contact hole may be formed on section where the first layer thin film and second layer then film are stacked. In this case, at least one part of the anchor part may be formed by the first layer thin film. In addition, at least one part of the spring may be formed by the second layer thin film. Furthermore, the first layer thin film and the second layer thin film may be formed on a resist pattern. In addition, the first layer thin film may be a metal film, and the second layer thin film may be a conducting film. A surface exposed to the exterior of the first layer thin film and the second layer thin film may be covered with an insulation film.

The height of a rim of the contact hole may be half or more of the height of the supporting column inserted thereinto, and the width at a bottom surface of the contact hole may be set to the same width as the supporting column, and the width of an aperture of the contact hole may be wider than the width at the bottom surface. The number of the contact holes may be fewer than the number of the supporting columns, and a thin film may be formed on the bottom surface of the contact hole and a thin film may be formed on the first substrate at a section where it contacts with a supporting column without held by any contact hole with the same material as the former thin film. That is, the contact hole may be formed at the same time and by the same manufacturing process as the movable type shutter. For example, the contact hole may be a cylinder formed on the transparent substrate. An inner diameter at the bottom surface of the contact hole may be set to the same diameter as an outer diameter of the supporting column, the aperture of the contact hole may be coaxial with the bottom surface of the contact hole, and an inner diameter of the aperture of the contact hole may be larger than the outer diameter of the supporting column.

The second substrate may include a transparent substrate and a non-transparent part which contacts with the transparent substrate and is formed with the aperture.

A method according to the present disclosure is for manufacturing a display device which includes a first substrate arranged with a movable type shutter on a transparent substrate, and a second substrate arranged with an aperture corresponding to the movable type shutter, the aperture allowing light to pass through and the first substrate and second substrate being arranged opposite each other at a certain interval. The method includes forming a plurality of supporting columns on a surface of the second substrate which opposes the first substrate, forming a contact hole for holding the plurality of supporting columns on the first substrate, into which one of the plurality of supporting columns being inserted, and inserting a supporting column among the plurality of supporting columns of the second substrate corresponding to a contact hole of the first substrate into the corresponding contact hole.

A resist pattern may be formed on the transparent substrate, a thin film may be formed on the resist pattern, and the resist pattern may be removed after forming a plate-shaped shutter blade with an opening which forms the movable shutter, a spring connected at one end to the plate-shaped shutter blade, and an anchor part connecting to another end opposite to the end connected to the plate-shaped shutter blade by etching the resist pattern in order to manufacture a movable type shutter of a first substrate. The contact hole may be formed at the same time and by the same manufacturing process as the movable type shutter. For example, a cylinder which forms the contact hole may be formed with the resist pattern, and a resist pattern which forms the contact hole may be left when removing the resist pattern. In this case, the thin film may be formed on a surface of the resist pattern which forms the contact hole. Furthermore, a surface of the thin film exposed to the exterior may be covered with an insulation film after the resist pattern is removed.

BRIEF DESCRIPTION OF THE DRAWINGS

FIG. 1 (b) is a planar view diagram of a display device according to an embodiment of the present invention;

DESCRIPTION OF EMBODIMENTS

Figure 1:
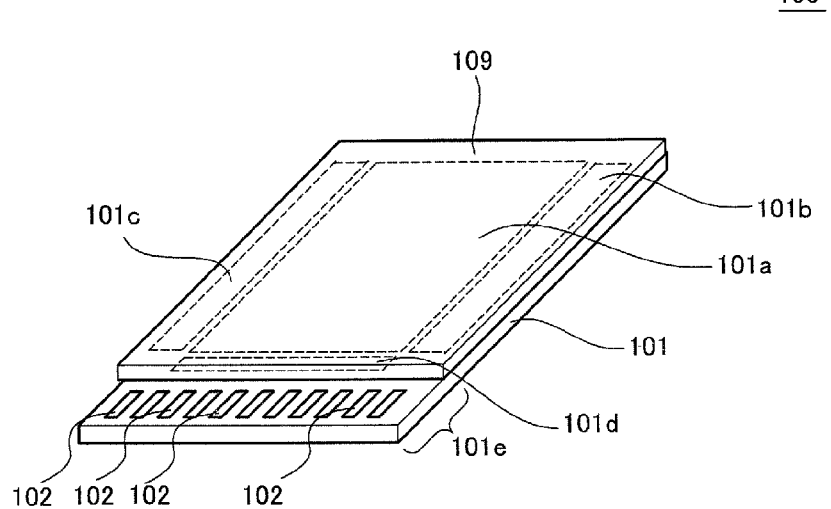
FIG. 1 (a) is a perspective view diagram of a display device according to an embodiment of the present invention.
Figure 1:
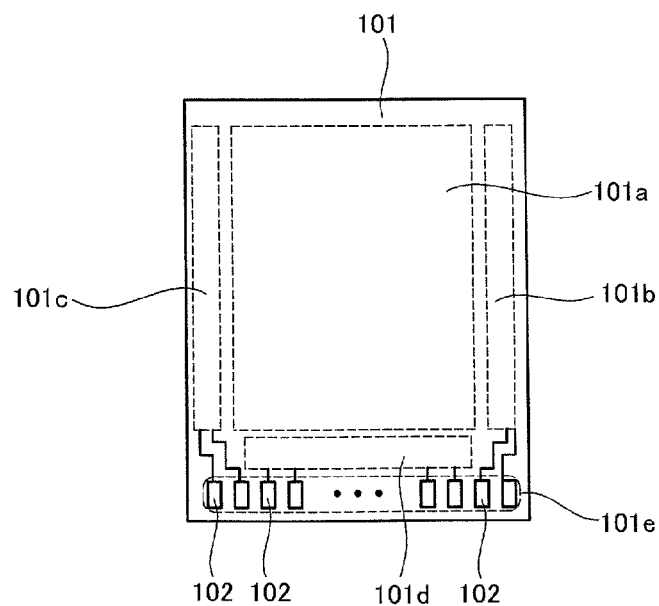

The preferred embodiments for realizing the present invention are explained below with referring to the drawings. Furthermore, the present invention is not limited to the embodiments explained below and various changes and modifications may be made without departing from the scope of the appended claims.

FIG. 1 shows a display device 100 according to one embodiment of the present invention. FIG. 1 (a) is a perspective view of the display device 100 and FIG. 1 (b) is a planar view of the display device 100. The display device 100 includes a MEMS substrate 101 equivalent to a first substrate and an AP substrate 109 equivalent to a second substrate. The MEMS substrate 101 includes a display part 101a, drive circuits 101b, 101c and 101d, and a terminal part 101e. The MEMS substrate 101 and AP substrate 109 are bonded together using a supporting column described below and a shield material not shown in the diagram.

Figure 2:
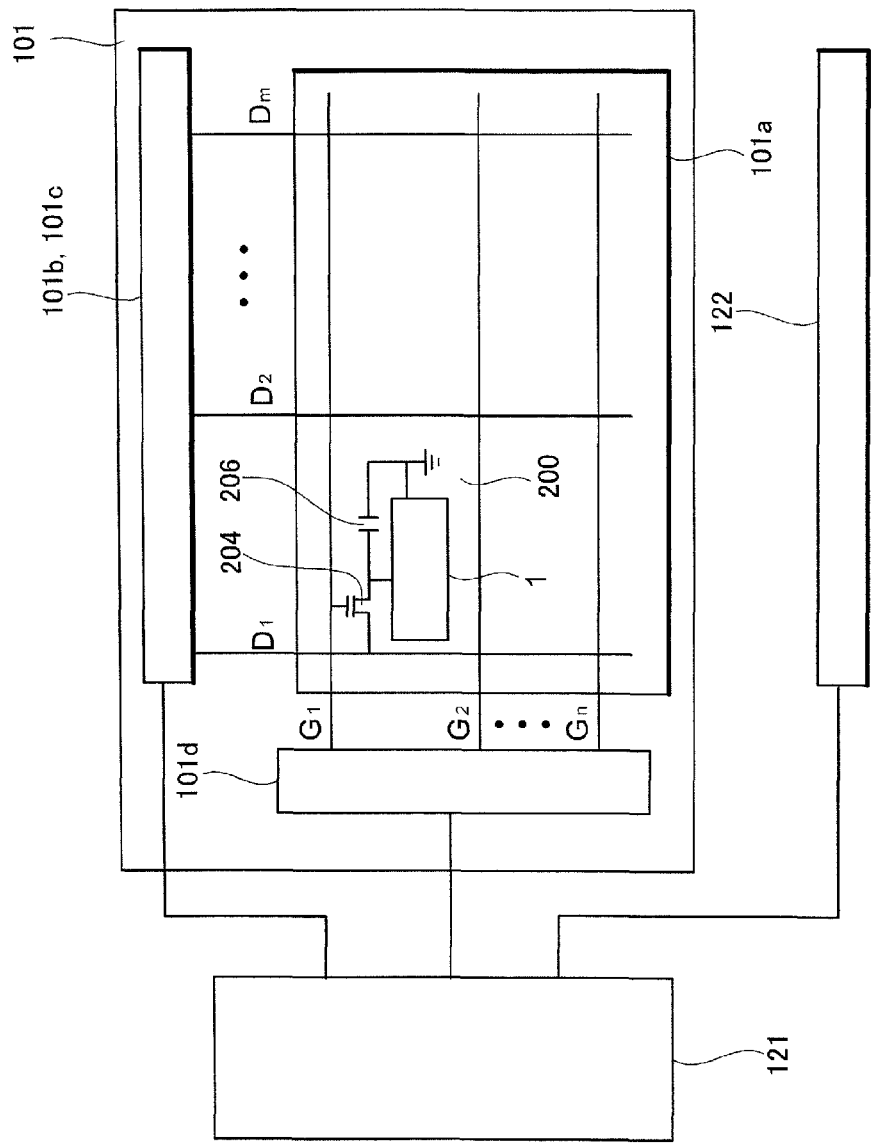
FIG. 2 is a block diagram which shows a circuit structure on a MEMS substrate.

FIG. 2 is a circuit block diagram of the display device 100. An image signal and a control signal are supplied to the display device 100 from a controller 121. In addition, light is supplied to the display device 100 from a back light 122 controlled by the controller 121.

As is shown in FIG. 2, the display part 101a includes a pixel 200 which includes a movable shutter 1, a switching element 204, and retention capacitor 206, at each position corresponding to an intersecting point of gate lines (G1, G2, ... Gn) and data lines (D1, D2, ... Dm). The drive circuits 101b, 101c are data drivers and supply a data signal to the switching element 204 via the data lines (D1, D2, ... Dm). The drive circuit 101d is a gate driver and supplies a gate signal to the switching element 204 via the gate lines (G1, G2, ... Gn). The switching element 204 drives the movable shutter 1 based on a data signal supplied from the data lines (D1, D2, ... Dm).

Figure 3:
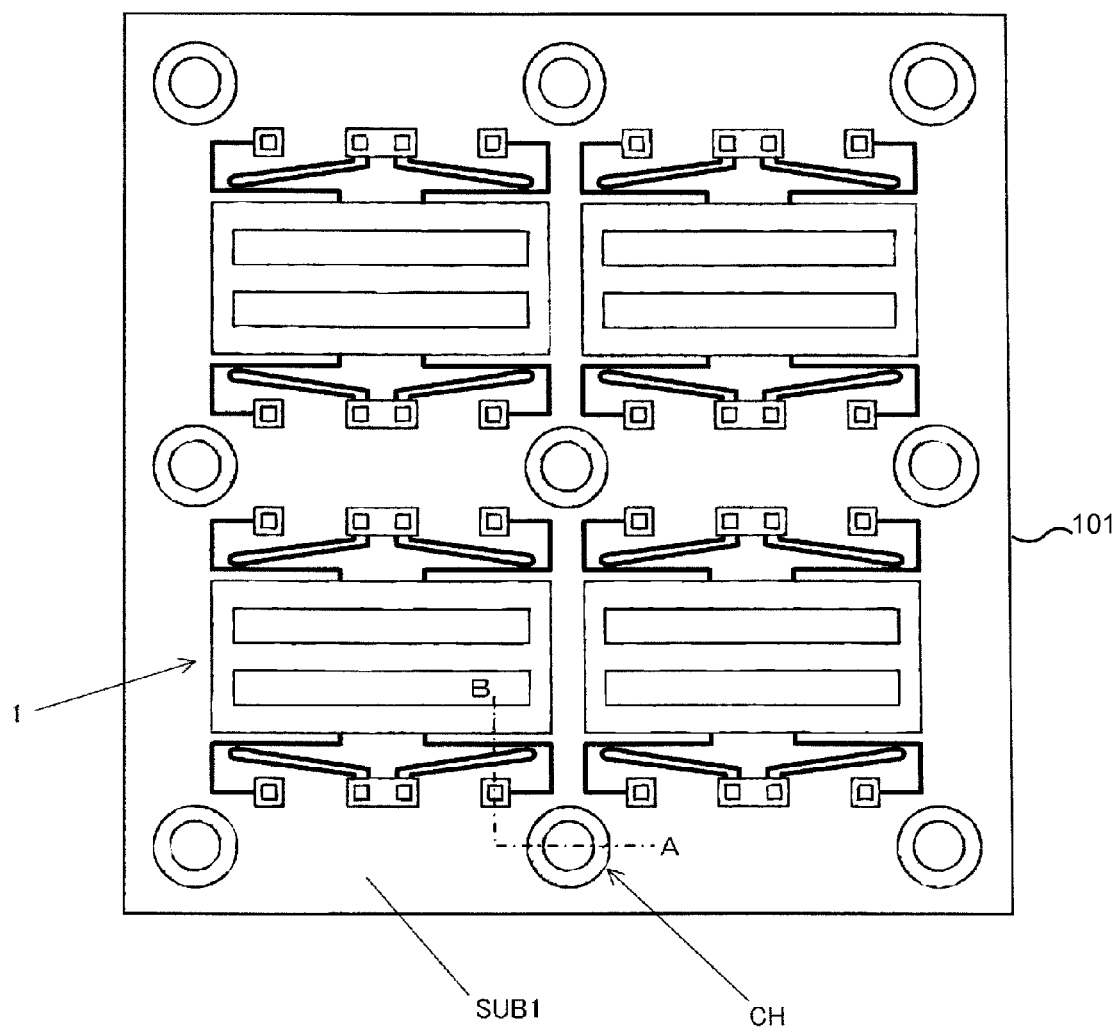
FIG. 3 is a planar view diagram of a MEMS substrate which includes MEMS shutters for a plurality of pixel.
Figure 6:
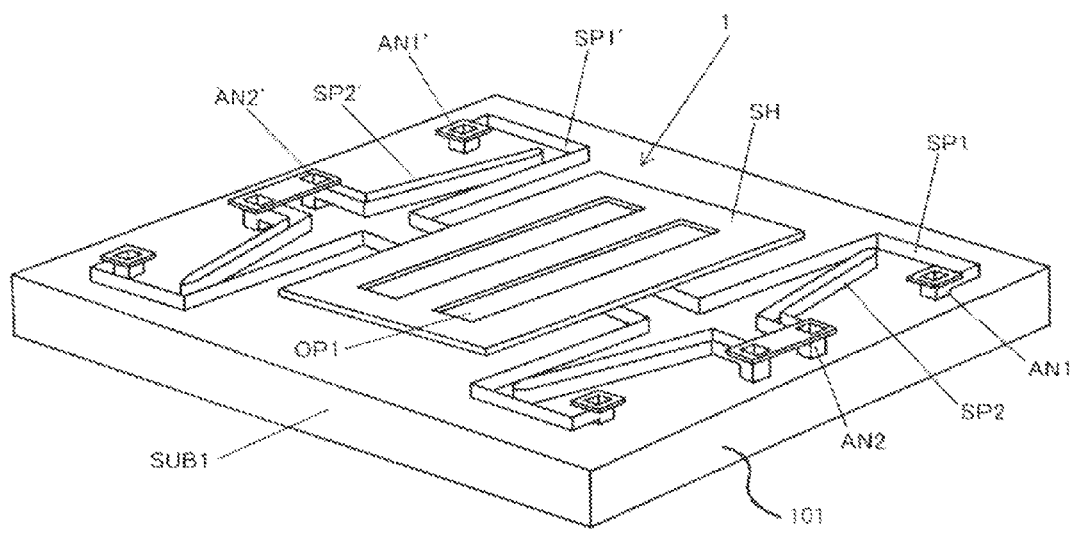
FIG. 6 is a perspective view diagram of each MEMS shutter.
Figure 7:
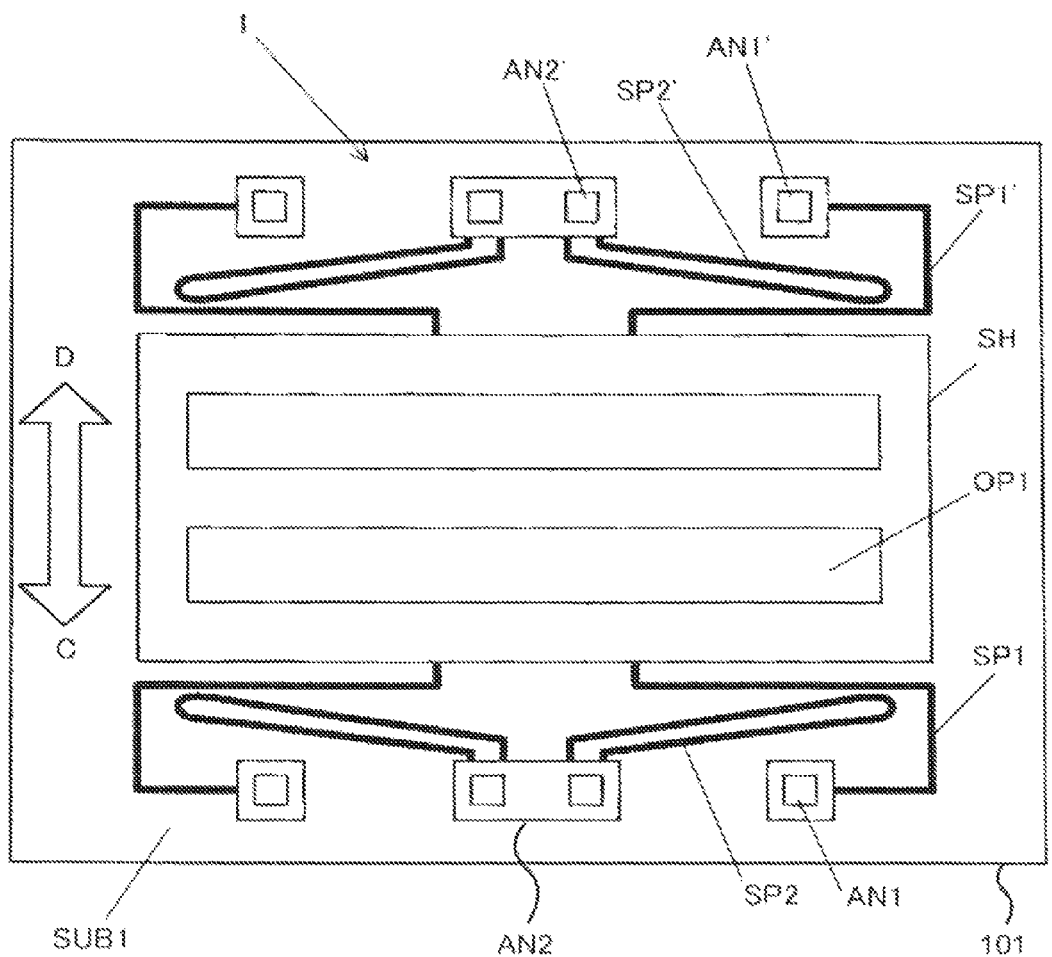
FIG. 7 is a planar diagram of each MEMS shutter.
Figure 8:
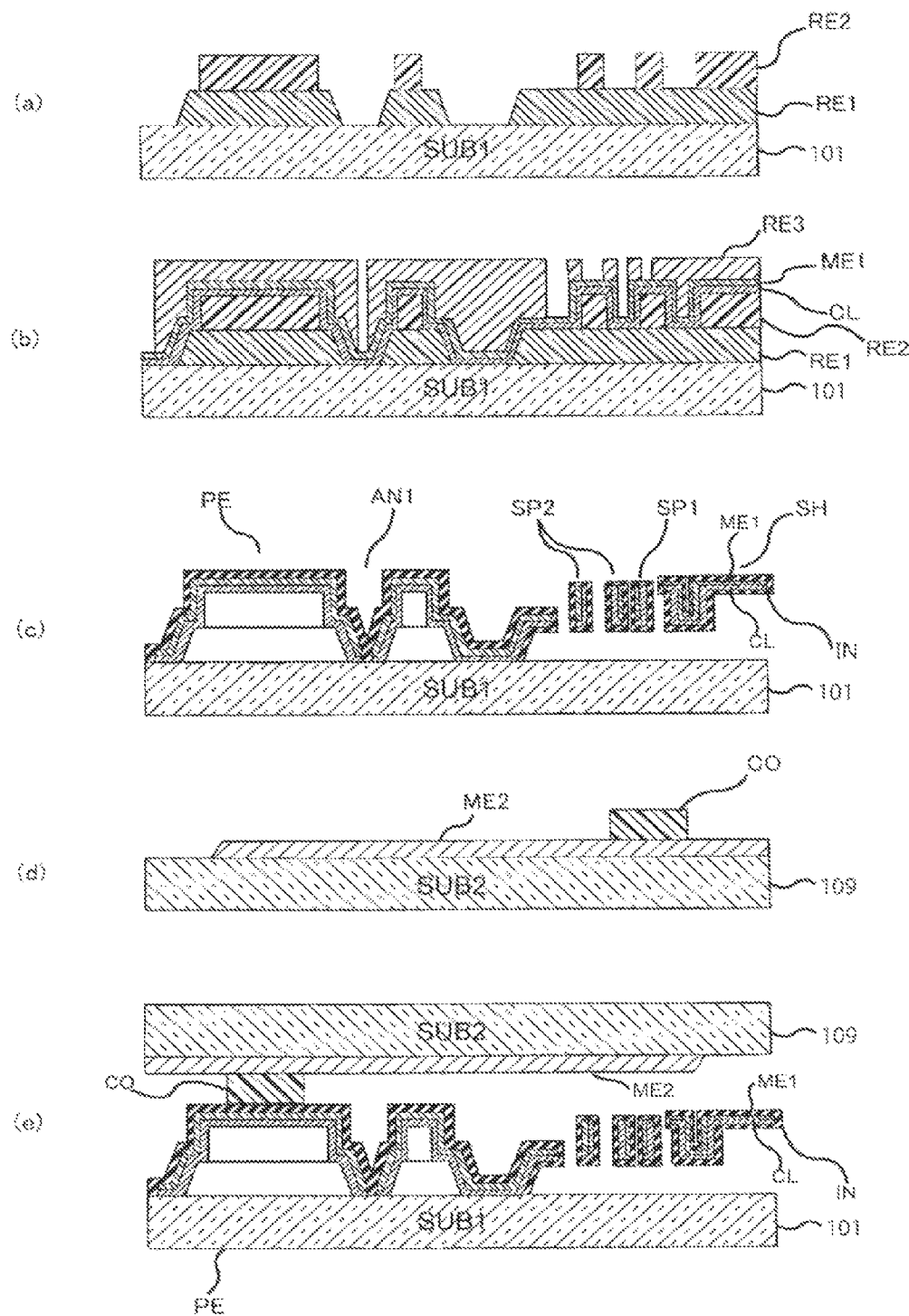
FIG. 8 (a)-(e) are diagrams which explains one part of a manufacturing process of a conventional MEMS substrate and AP substrate.

FIG. 3 is a planar diagram which shows a section including four pixels in the MEMS substrate 101. The MEMS substrate 101 is structured by forming and arranging the movable shutter 1 corresponding to a display pixel on the surface of a transparent substrate (SUB1) such as glass. Because the structure of the movable shutter 1 is explained above using FIG. 6 and FIG. 7, that explanation is incorporated herein by reference. However, a contact hole (CH) is formed at a position where in FIG. 8 a base (PE) is formed in the MEMS substrate 101 in the present embodiment.

Figure 4:
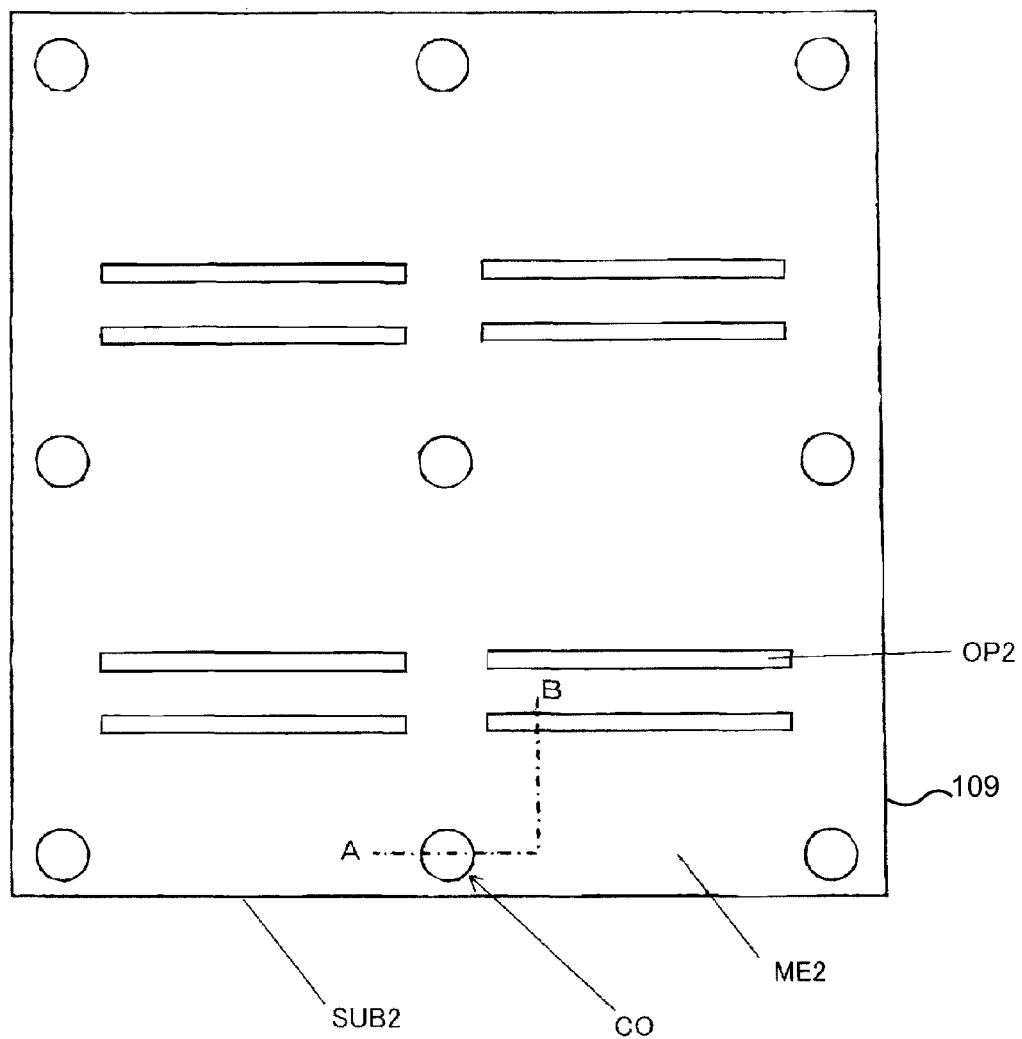
FIG. 4 is a planar view diagram of an AP substrate.

FIG. 4 is a planar diagram which shows a section including four pixels in the AP substrate 109. The AP substrate 109 is structured by forming a metal film (ME2) having light blocking effects on the surface of a transparent substrate (second substrate, SUB2) such as glass, and by removing the metal film only from an opening part (OP2) which forms an aperture. However, in the AP substrate 109 of the present embodiment, a supporting column is formed at a position corresponding to a contact hole CH in the MEMS substrate 101 shown in FIG. 3.

Figure 5:
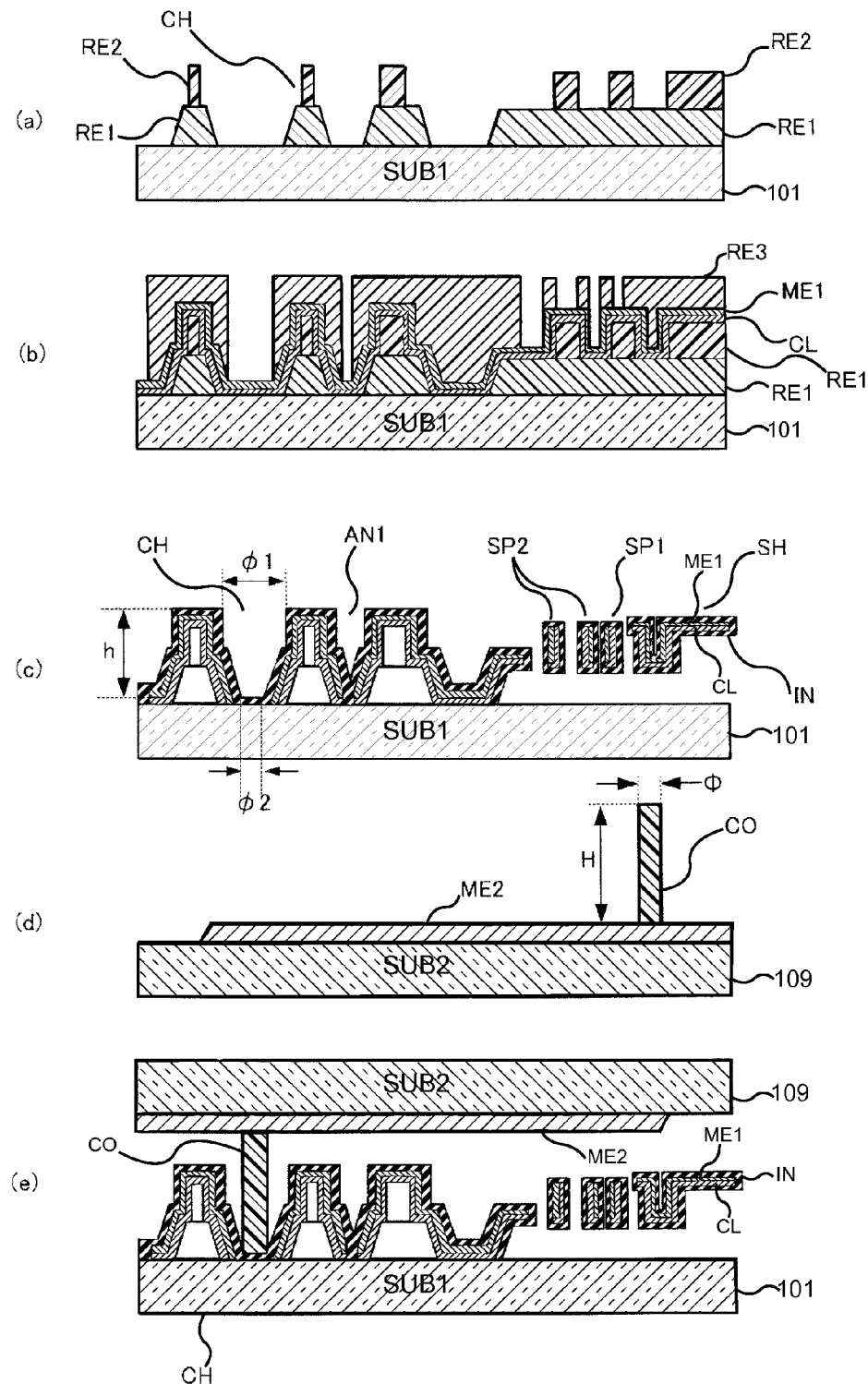
FIG. 5 (a)-(e) are diagrams which explains one part of a manufacturing process of a MEMS substrate and AP substrate.

Next, a manufacturing process of a contact hole (CH) using the present embodiment is explained using FIG. 5. FIG. 5 (a) to FIG. 5 (e) show a vertical cross section along a dotted line which connects A and B shown in FIG. 3 and FIG. 4 at each stage of the manufacturing process. As is shown in FIG. 5, the contact hole (CH) is formed at the same time using a different resist pattern to the movable shutter 1 via the same manufacturing process as the movable shutter 1. This is explained in detail below.

In FIG. 5 (a), the bottom surface side part (RE1) of the contact hole (CH) and an upper part (RE2) are formed using the same photo resist pattern (RE1, RE2) as a base for forming a shutter (SH) comprising the movable shutter 1, a first spring (SP1, SP1'), a second spring (SP2, SP2') and an anchor part (AN1, AN1', AN2, AN2'). Specifically, first the resist pattern 1 is patterned in the shape shown in FIG. 5 (a) using photolithography for example. At this time, a contact hole for receiving a supporting column and the base of the anchor part (AN1, AN1', AN2, AN2') are formed. Next, the resist pattern (RE2) is patterned in the shape shown in FIG. 5 (a) using photolithography for example. A this time, a contact hole (CH) for receiving a supporting column (CO) is formed slightly larger than the contact hole (CH) formed in the resist pattern (RE1) and at a position which becomes the center of a contact hole (CH) of the resist pattern (RE1) when the base of the first spring (SP1, SP1'), and second spring (SP2, SP2') is formed.

In FIG. 5 (b), a conducting film (CL) such as a semiconductor for securing conductivity is formed on the surface of the resist pattern (RE1, RE2), and a metal film (ME1) for securing light blocking effects is stacked thereupon. Next, a resist pattern RE3 is formed corresponding to the planar shape of the shutter SH and first and second springs etc.

Next, etching is performed using the resist pattern RE3, the shutter (SH), first spring (SP1, SP1'), and second spring (SP2, SP2') are formed and following this, unnecessary parts of the resist pattern (RE1 to RE3) are removed and an insulation film (IN) of $Al_2O_3$ or SiN is formed as is shown in FIG. 5 (c) on the remaining parts of the metal film (ME1) and conducting film (CL).

In the stage shown in FIG. 5 (c), based on the relationship with the shape (height H, width $\phi$) of the supporting column (CO) of the AP substrate, the height of a contact hole (CH) is half the height H or more of a supporting column (CO) shown in FIG. 5 (d), the inner diameter $\phi 2$ at the bottom surface of the contact hole (CH) is the same as the outer diameter $\phi 2$ of the supporting column, and the inner diameter $\phi 2$ at the opening of a contact hole (CH) is larger than the inner diameter $\phi 2$ at the bottom surface, When the MEMS substrate 101 and the AP substrate 109 are bound together, it is preferred that the contact hole (CH) first contacts the structural part of the AP substrate 109 among the structural parts of the MEMS substrate 101. In order to achieve this, it is necessary to position the apex part of the contact hole (CH) at the highest position of the MEMS substrate 101. Moreover, it is preferred that the height of a contact hole (CH) is set to half or more of the height of a supporting column (CO) in order to hold a supporting column (CO) inserted into a contact hole (CH) so that is does not jump out from the contact hole. For example, if the height of a supporting column (CO) is 12 μm, and the height of a contact hole (CH) is set to around 8 μm, the distance between the shutter (SH) and aperture (opening part of the metal film (ME2)) is around 4 μm.

The contact hole (CH) in the MEMS substrate 101 is formed so that the inner diameter (bottom diameter) φ2 at the bottom surface is the same as the outer diameter φ of a supporting column (CO). In addition, the inner diameter φ1 of the opening at the top end of a contact hole (CH) is set to dimensions that provide a likelihood of alignment precision of a binding device. For example, in the case where the width of a supporting column is 10 μm, and the alignment precision of a binding device is ±3 μm, the inner diameter at the bottom surface of a contact hole (CH) becomes 10 μm, and the radius of an opening at the top end becomes at least 8 μm (therefore, φ1=16 μm).

Next, as is shown in FIG. 5 (e), the MEMS substrate 101 (transparent substrate (SUB1)) and AP substrate 109 (transparent substrate (SUB2)) are brought close together after arranging the substrates so that they mutually oppose each other in an alignment state. Then, a supporting column (CO) is inserted into a contact hole (CH), and fit in to be hold in the contact hole (CH) in the vicinity of the bottom surface, so that binding of the MEMS substrate 101 and AP substrate 109 is completed by self-alignment. Moreover, because the supporting column (CO) is formed only on the AP substrate 109 and does not have any joins, durability to external impacts is high and therefore reliability is improved.

A transparent liquid is sealed between the MEMS substrate 101 and AP substrate 109 as a working fluid. It is preferred that the working fluid has high light transmittance and insulation properties, a high dielectric constant and a refractive index close to a refractive index of the transparent substrate (SUB1) of the MEMS substrate 101 and the transparent substrate (SUB2) of the AP substrate 109, and it is preferred that the working fluid is an oil and so on which does not prevent to the movement of movable parts such as the shutter (SH) and spring (SP1, SP1', SP2, SP2').

FIG. 3 and FIG. 4 show examples where the number of supporting columns (CO) and the number of contact holes (CH) is the same. However, the number of contact holes (CH) may be set fewer than the number of supporting columns (CO). This is because an extremely high level of precision in the manufacturing process is demanded to allow all the supporting columns (CO) to be inserted into all the contact holes (CH). For example, the number of contact holes (CH) may be set to half or less the number of supporting columns (CO) or more preferably a third or less, and in a section where there are no contact holes, a supporting column (CO) may be formed so as to contact the MEMS substrate 101.

In this case, because variation in the pressure applied to a supporting column is produced when the distance between the MEMS substrate 101 and the AP substrate 109 is different by the position of a supporting column (CO) inserted into a contact hole (CH) and the position of a supporting column (CO) which contacts the MEMS substrate 101, it is preferred that a thin film formed at the bottom surface of a contact hole (CH) is formed with the same film thickness and same material as a thin film formed at a section which contacts with the MEMS substrate (first substrate) 101 without the supporting column (CO) being held in a contact hole (CH). In the case where a supporting column (CO) directly contacts a transparent substrate (SUB1) which forms the MEMS substrate 101, it is preferred that the transparent substrate (SUB1) is exposed even at the bottom surface of the contact hole (CH). Furthermore, if the thickness of the thin film is extremely thin to the extent that it provides no effects on the variation of the distance between the MEMS substrate 101 and the AP substrate, then the presence of this thin film may be ignored.

As described above, according to the present embodiment, self-alignment during the binding process of the MEMS substrate 101 and AP substrate 109 is possible and it is possible to provide a display device with a high level of reliability to external impacts.

That is, as in the present embodiment, if a plurality of supporting columns (CO) are formed on the surface of the AP substrate (second substrate), and contact holes (CH) are formed into which the supporting columns (CO) are inserted and held by the contact holes (CH) on the MEMS substrate (first substrate) 101, self-alignment when binding the MEMS substrate 101 and the AP substrate 109 is easily realized simply by inserting the supporting columns into the contact holes (CH).

Furthermore, because the supporting columns (CO) are formed on the AP substrate 109, conventional defects such as a supporting column piercing a base do not occur and it is possible to provide a MEMS display device which is strong to external impacts.

What is claimed is:

1. A display device comprising:
   a first substrate arranged with a movable type shutter on a transparent substrate; and
   a second substrate arranged with an aperture corresponding to the movable type shutter, the aperture allowing light to pass through and the first substrate and second substrate being arranged opposite each other at a certain interval;
   wherein a plurality of supporting columns is formed on a surface of the second substrate which opposes the first substrate, and a contact hole for holding one of the plurality of supporting columns is formed on the first substrate, the plurality of supporting columns being inserted into the contact hole.

2. The display device according to claim 1, wherein the contact hole is formed at the same time and by the same manufacturing process as the movable type shutter.

3. The display device according to claim 1, wherein the movable type shutter includes a plate-shaped shutter blade formed with an opening, a spring connected at one end to the plate-shaped shutter blade, and an anchor part connecting to another end opposite to the end connected to the plate-shaped shutter blade, a first layer thin film and a second layer thin film stacked touching the first layer film are formed on the transparent substrate;
   the contact hole is formed on a section where the first layer thin film and second layer thin film are stacked; and
   at least one part of the anchor part is formed by the first layer thin film.

4. The display device according to claim 3, wherein at least one part of the spring is formed by the second layer thin film.

5. The display device according to claim 3, wherein the first layer thin film and the second layer thin film are formed on a resist pattern.

6. The display device according to claim 1, wherein height of a rim of the contact hole is half or more of a height of the supporting column inserted thereinto, and the width at a bottom surface of the contact hole is set to the same width as the supporting column, and the width of an aperture of the contact hole is wider than the width at the bottom surface.

7. The display device according to claim 1, wherein a number of the contact holes is fewer than a number of the supporting columns, and a thin film is formed on a bottom surface of the contact hole and a thin film is formed on the first substrate at a section where it contacts with a supporting column without being held by any contact hole with same material as the former thin film.

8. The display device according to claim 5, wherein the contact hole has a cylindrical shape formed by the resist pattern on the transparent substrate.

9. The display device according to claim 1, wherein the contact hole is a circular hole formed on the transparent substrate.

10. The display device according to claim 9, wherein an inner diameter at the bottom surface of the contact hole is set to the same diameter as an outer diameter of the supporting column, an aperture of the contact hole is coaxial with the bottom surface of the contact hole, and an inner diameter of the aperture of the contact hole is larger than the outer diameter of the supporting column.

11. The display device according to claim 3, wherein the first layer thin film is a metal film.

12. The display device according to claim 4, wherein the second layer thin film is a conducting film.

13. The display device according to claim 3, wherein a surface exposed to the exterior of the first layer thin film and the second layer thin film is covered with an insulation film.

14. The display device according to claim 1, wherein the second substrate includes a transparent substrate and a non-transparent part which contacts with the transparent substrate and is formed with the aperture.

15. A method of manufacturing a display device including a first substrate arranged with a movable type shutter on a transparent substrate, and a second substrate arranged with an aperture corresponding to the movable type shutter, the aperture allowing light to pass through and the first substrate and second substrate being arranged opposite each other at a certain interval, comprising:

forming a plurality of supporting columns on a surface of the second substrate which opposes the first substrate;

forming a contact hole for holding one of the plurality of supporting columns on the first substrate, the plurality of supporting columns being inserted into the contact hole; and inserting a supporting column of the plurality of supporting columns of the second substrate corresponding to a contact hole of the first substrate into the corresponding contact hole.

16. The method of manufacturing a display device according to claim 15, wherein the contact hole is formed at the same time and by the same manufacturing process as the movable type shutter.

17. The method of manufacturing a display device according to claim 16, further comprising:

forming a resist pattern on the transparent substrate;

forming a thin film on the resist pattern; and removing the resist pattern after forming a plate shaped shutter blade with an opening which forms the movable shutter, a spring connected at one end to the plate-shaped shutter blade, and an anchor part connecting to another end opposite to the end connected to the plate-shaped shutter blade by etching the resist pattern.

18. The method of manufacturing a display device according to claim 17, further comprising:

forming a cylinder which forms the contact hole using the resist pattern; and leaving a resist pattern which forms the contact hole when removing the resist pattern.

19. The method of manufacturing a display device according to claim 18, wherein the thin film is formed on a surface of the resist pattern which forms the contact hole.

20. The method of manufacturing a display device according to claim 19, wherein a surface of the thin film exposed to the exterior is covered with an insulation film after the resist pattern is removed.

* * * * *